United States Patent [19]
Reese et al.

[11] Patent Number: 5,619,901
[45] Date of Patent: Apr. 15, 1997

[54] BEVERAGE DISPENSING MACHINE

[76] Inventors: Joseph J. Reese, 2578 Thompson Dr., Marriottsville, Md. 21104; John F. Hasson, 608-A Knollcrest Pl., Cockeysville, Md. 21030

[21] Appl. No.: 317,709

[22] Filed: Oct. 4, 1994

Related U.S. Application Data

[63] Continuation-in-part of Ser. No. 266,502, Jun. 27, 1994, abandoned, which is a continuation-in-part of Ser. No. 959,100, Oct. 9, 1992, Pat. No. 5,323,691.

[51] Int. Cl.⁶ .................................................... A23L 2/00
[52] U.S. Cl. ................................ 99/275; 99/300; 99/484; 222/132
[58] Field of Search .................................. 99/275, 323.3, 99/286, 300, 316, 486; 366/154.1, 155.1; 222/135, 145.6, 640, 132, 129.3, 144.5, 158

[56] References Cited

U.S. PATENT DOCUMENTS

| | | | |
|---|---|---|---|
| 2,712,887 | 7/1955 | King | 222/132 |
| 2,724,949 | 11/1955 | Kattis | 62/4 |
| 3,297,061 | 1/1967 | Nimee | 141/9 |
| 3,335,911 | 8/1967 | Stutz | 222/70 |
| 3,428,218 | 2/1969 | Coja | 222/23 |
| 3,441,176 | 4/1969 | Reynolds et al. | 222/70 |
| 3,548,280 | 12/1970 | Cockroft | 318/443 |
| 3,568,887 | 3/1971 | Jacobs | 222/70 |
| 3,671,020 | 6/1972 | Krup | 259/18 |
| 3,702,666 | 11/1972 | Stano | 222/129.4 |
| 3,791,597 | 2/1974 | Walter et al. | 241/100 |
| 3,837,587 | 9/1974 | Walter et al. | 241/260.1 |
| 4,027,783 | 6/1977 | Branch et al. | 222/129.3 |
| 4,276,750 | 7/1981 | Kawasumi | 62/137 |
| 4,319,698 | 3/1982 | Tomiyama et al. | 222/129.1 |
| 4,324,494 | 4/1982 | Pryor et al. | 366/155 |
| 4,517,651 | 5/1985 | Kawasaki et al. | 364/479 |
| 4,528,824 | 7/1985 | Herbert | 62/331 |
| 4,566,287 | 1/1986 | Schmidt et al. | 222/129.3 |
| 4,595,131 | 6/1986 | Ruskin et al. | 222/640 |
| 4,653,281 | 3/1987 | Van Der Veer | 62/71 |
| 4,681,030 | 7/1987 | Herbert | 99/484 |
| 4,776,489 | 10/1988 | Tarlow et al. | 222/132 |
| 4,786,002 | 11/1988 | Mitsubayashi et al. | 241/101 B |
| 4,960,228 | 10/1990 | Takahashi et al. | 222/146.6 |
| 4,982,877 | 1/1991 | Burton | 222/135 |
| 5,323,691 | 6/1994 | Reese et al. | 99/275 |
| 5,368,196 | 11/1994 | Hellenberg et al. | 222/135 |
| 5,405,054 | 4/1995 | Thomas | 222/146.6 |

FOREIGN PATENT DOCUMENTS 7385374  1/1977  Austria.

Primary Examiner—David Scherbel
Assistant Examiner—James F. Hook
Attorney, Agent, or Firm—Leonard Bloom

[57] ABSTRACT

A beverage dispensing machine assures precise portion control of the respective drink mixes being dispensed, and the precise amount is adjustable within certain limits. The drink mixes are in respective beverage receptacles (or drink tubes) arranged in a side-by-side relationship with respect to each other, and a plurality of selection buttons are disposed directly below the receptacles in substantial vertical alignment therewith. A counter and a interrupt button, respectively, are also provided on the control panel. The level of the drink mixes, as well as the ice in the reservoir, are readily visible at all times. Upon initiation of the blending cycle, the blender motor is started, and after a first time delay, the drink mix is discharged into the blender for a first time period. Upon a second time delay following initiation of the discharge of the mix, the ice shaver motor continues for a second time period; and the blender motor continues after discharge of the mix and delivery of the shaved ice.

5 Claims, 14 Drawing Sheets

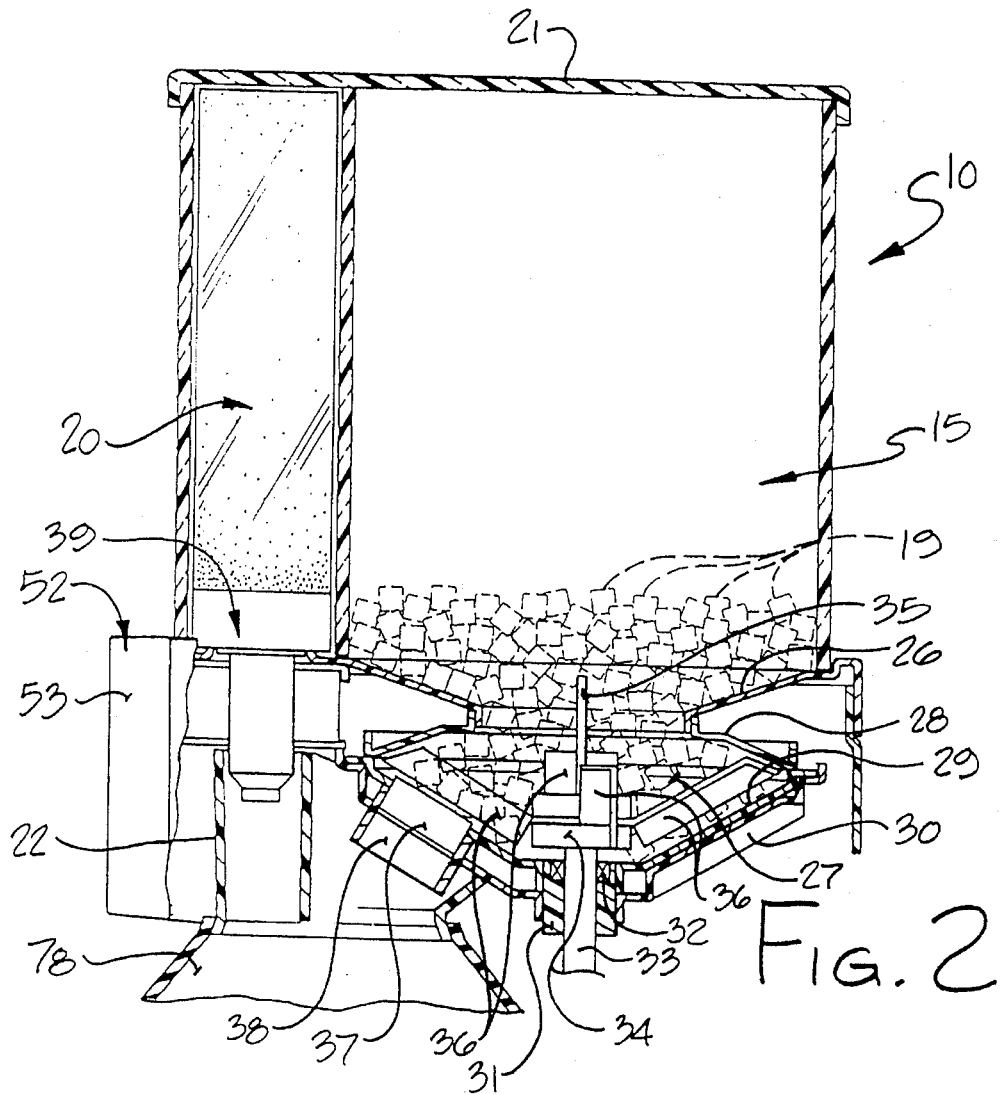
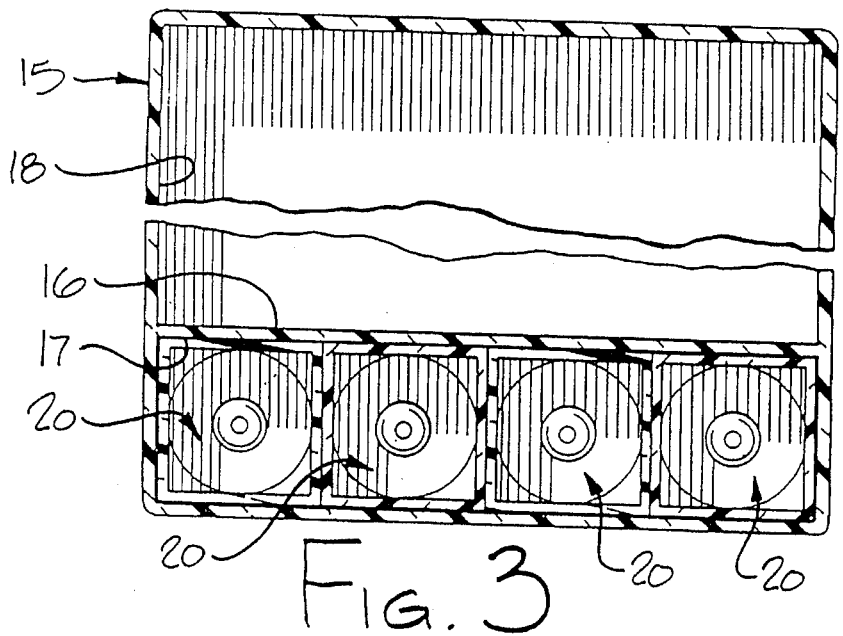

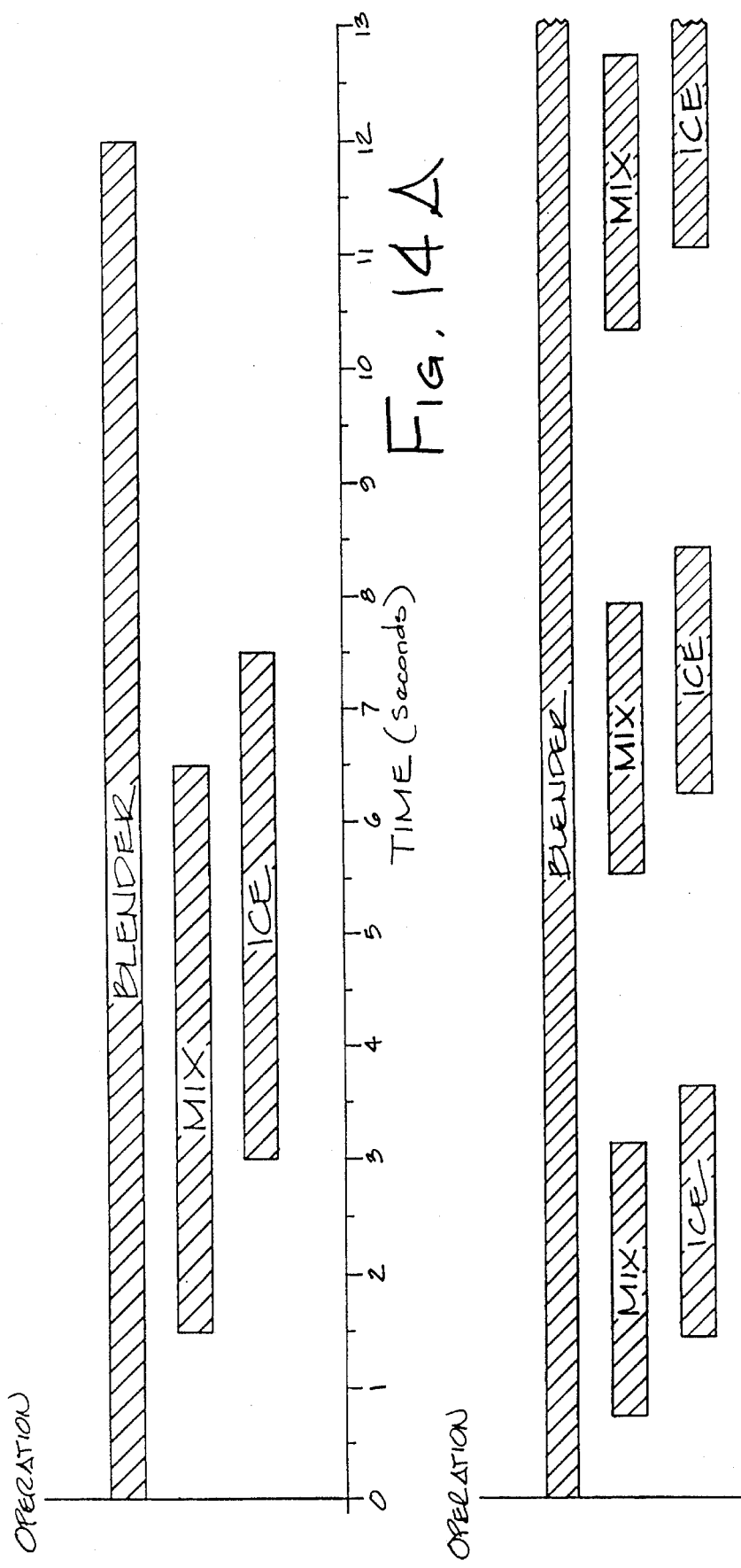

BEVERAGE DISPENSING MACHINE

CROSS-REFERENCE TO RELATED APPLICATION

The present invention is a continuation-in-part of application Ser. No. 08/266,502, filed Jun. 27, 1994 now abandoned, which, in turn, is a continuation-in-part of application, Ser. No. 959,100, filed Oct. 9, 1992 (now U.S. Pat. No. 5,323,691 issued on Jun. 28, 1994) the disclosures of which the incorporated herein in their entirety.

FIELD OF THE INVENTION

The present invention provides an improved beverage dispensing machine for use by restaurants, bars, caterers, country clubs or the like, and, more particularly, to a frozen drink mix to which alcohol may be added if desired.

BACKGROUND OF THE INVENTION

Beverage dispensing machines, whether alcoholic or non-alcoholic, are quite old in the art.

Typically, a beverage mix in liquid form is placed in a blender pitcher (referred to in the art as a "jar") together with ice cubes and, thereafter, the mix and the ice are blended and the finished drink (or drinks) are poured into suitable glasses for enjoyment by the respective customers.

Beverage dispensing machines, wherein the crushed or shaved ice is available directly on the machine, are also known.

The amounts of beverage mix and the ice (as well as the alcohol, if desired) are usually "eyeballed" by the bartender—resulting in spillage or waste—and there is no convenient way to control the portion (or portions) of the mix being dispensed, nor the amount of shaved ice delivered to the blender.

In an effort to alleviate these prior art disadvantages, the aforementioned '691 patent disclosed an initial prototype of an improved beverage dispensing machine, wherein a series of respective receptacles was provided in the machine, each receptacle containing a different mix; and wherein the level of the mix remaining in each receptacle could be viewed through a transparent cap. Additionally, the cumulative total of all of the drinks dispensed was registered on a counter. A plurality of momentary push buttons was provided to select a particular drink mix, and a separate plurality of push buttons was provided for the number of servings desired.

None of these push buttons was in registry with the respective drink mix, however, nor was precise portion control readily facilitated.

Additionally, the prior art machines intended for commercial establishments delivered the shaved ice, then started the blender motor, delivered the drink mix, and finally blended the beverage. This is unsatisfactory for a number of reasons, especially since the ice could freeze up prematurely and thus interfere with the quality and enjoyment of the mixed drinks.

SUMMARY OF THE INVENTION

Accordingly, it is an object of the present invention to provide, in a beverage dispensing machine having a blender, a portion control means to dispense a precise predetermined amount of the drink mix and shaved ice, respectively, thereby avoiding waste and inconsistent flavors.

It is another object of the present invention to provide a means for adjusting the predetermined controlled portion of the mix.

It is yet another object of the present invention to provide a plurality of vertically-oriented individual receptacles for the various drink mixes, the receptacles being arranged side-by-side, together with a corresponding plurality of readily-visible selection buttons disposed below the receptacles and in substantial alignment therewith.

It is a still further object of the present invention to provide a beverage dispensing machine which is easy and convenient to use, economically manufactured for widespread marketing and distribution, rugged and reliable for heavy-duty use by restaurants, cocktail lounges, caterers, private clubs and the like and, if necessary, readily serviceable.

The present invention finds particular utility in a beverage dispensing machine having a blender, wherein a drink mix is blended with shaved ice in the blender.

In accordance with the teachings of the present invention, a plurality of beverage receptacles is provided for a variety of respective drink mixes. Each of the beverage receptacles has a selection button juxtaposed therewith; and means are provided for dispensing a predetermined measured amount of the drink mix from a receptacle (as well as a predetermined amount of shaved ice from the ice reservoir) upon engagement of the respective selection button, thereby assuring precise control of the respective portions of the drink mix and shaved ice dispensed to the blender, and thereby avoiding waste and spillage and assuring the consistency and flavor of the finished beverage served to a customer.

In a preferred embodiment, the predetermined measured amount of the drink mix may be adjusted as well as the amount of shaved ice.

The respective receptacles are vertically oriented and are arranged in a side-by-side relationship with respect to each other, and each selection button is disposed directly below a respective beverage receptacle and vertically aligned therewith.

A number of predetermined measured amounts of the drink mix may be dispensed, depending upon the number of times the respective selection button is engaged during a dispensing cycle. In a preferred embodiment, the respective selection button may be engaged a maximum of three times during a particular dispensing cycle.

A housing on the machine has a transverse interior wall dividing the housing into a front compartment and a rear compartment. The front compartment houses the beverage receptacles, and the rear compartment provides a reservoir for the ice. Preferably, the housing is transparent, such that the level of the drink mix in each receptacle (as well as the ice remaining in the reservoir) is readily visible for convenient filling.

A counter on the machine provides a register of the cumulative total of all drinks dispensed by the machine. Also, an interrupt button is provided on the machine.

In a preferred embodiment, the means for dispensing a predetermined measured amount of the drink mix includes a piston subassembly reciprocating between alternate positions within the lower portion of each respective beverage receptacle. This piston subassembly includes a piston rod having a pair of ends including an upper end and a lower end. An upper valve is carried by the upper end of the piston rod, and a lower valve is carried by the lower end of the piston rod. The receptacle has an inlet port intermediately thereof, and this inlet port is alternately opened and closed by the upper valve on the piston rod. The receptacle further has a lower end provided with a discharge port, and this discharge port is alternately opened and closed by the lower valve on the piston rod. A solenoid is carried on the piston rod intermediately of the ends thereof, and an electromagnetic coil (disposed externally of the receptacle) surrounds the solenoid substantially concentrically thereof. Upon energization of the electromagnetic coil, the solenoid is actuated to reciprocate the piston subassembly from one alternate position to another, thereby alternately opening and closing the upper and lower valves, respectively.

As noted, the present invention finds particular utility for use in a beverage dispensing machine including a blender having a motor, wherein a drink mix is blended with shaved ice in the blender during a blending cycle.

In accordance with the further teachings of the present invention, a plurality of beverage receptacles is provided for a variety of respective drink mixes. Means are provided for starting the blender motor upon initiation of the blending cycle, and means are further provided for dispensing a measured amount of a respective drink mix upon a first time delay following the start of the blender motor. This measured amount of the respective drink mix continues for a first time period, thereby facilitating precise portion control of the drink mix. The shaved ice is delivered upon a second time delay following the start of the discharge of the measured amount of the respective drink mix; and the delivery of the shaved ice continues for a second time period, thereby assuring consistency and flavor of the finished beverage. Finally, the operation of the blender motor is continued for a predetermined duration following cut-off of the dispensing of the drink mix and the delivery of the shaved ice.

Adjustment means are provided for varying the first and second time delays, the first and second time periods, and the duration of operation of the blender motor for each of the beverage receptacles.

The adjustment means includes a microprocessor and, preferably, the microprocessor is remotely programmable externally of the machine.

These and other objects of the present invention will become apparent from a reading of the following specification taken in conjunction with the enclosed drawings.

BRIEF DESCRIPTION OF THE DRAWINGS

FIG. 2 is a longitudinal sectional view thereof, taken along the lines 2—2 of FIG. 1 and drawn to a enlarged scale, and showing the ice shaving mechanism and further showing the manifold for directing the drink mix and the shaved ice, respectively, into the blender.

FIG. 3 is a cross-sectional view thereof, taken along the lines 3—3 of FIG. 1 and drawn to an enlarged scale, and showing the transparent housing divided by a transverse interior wall to form, first, a compartment for the plurality of beverage receptacles arranged in a side-by-side relationship with respect to each other and, second, a rear compartment providing a reservoir for the ice.

FIGS. 14A and 14B are respective bar charts detailing the operation of the blending cycle or cycles, respectively.

GENERAL DESCRIPTION OF THE PREFERRED EMBODIMENT

Figure 1:
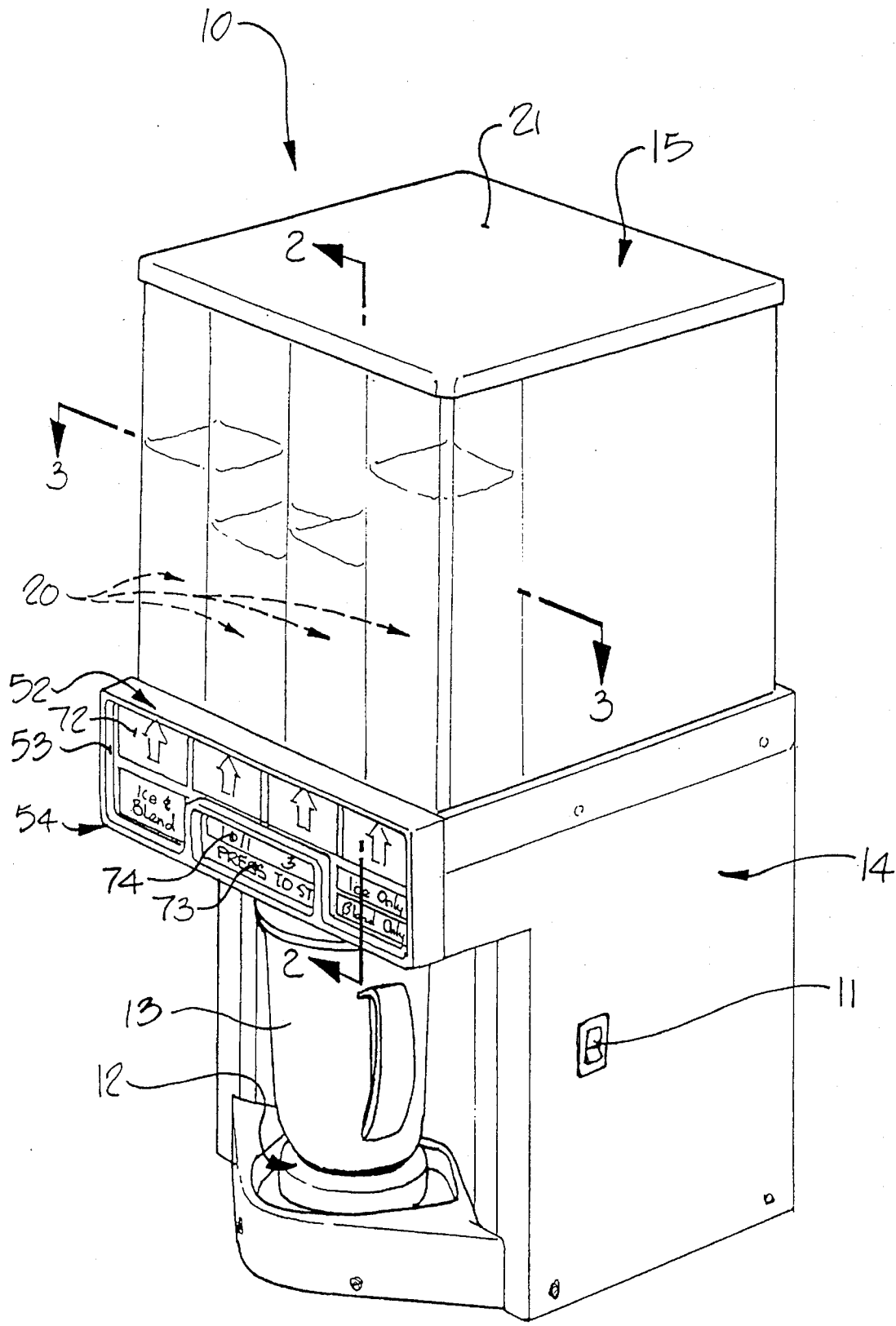
FIG. 1 is a perspective view of the improved beverage dispensing machine of the present invention.
Figure 4:
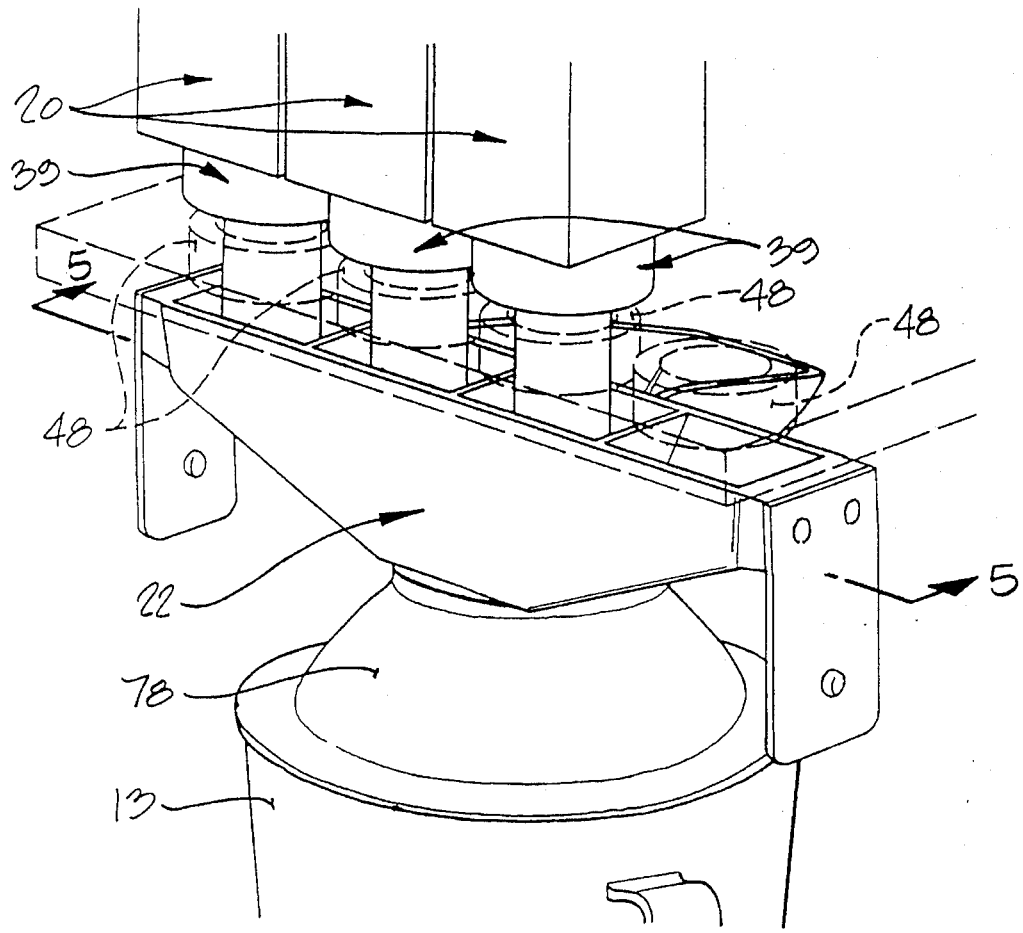
FIG. 4 is a partial exploded perspective view, showing the lower portions of some of the beverage receptacles, the manifold connecting the receptacles to the blender, and the top of the blender jar with the elastomeric seal therebetween.

With reference to FIGS. 1–5, the beverage dispensing machine generally includes an on/off switch 11, a blender or mixer 12, and a pitcher or "jar" 13 for pouring the mixed drinks into suitable glasses (not shown). The machine 10 further includes a frame 14 having a housing 15 mounted thereon.

The housing 15 has a transverse interior wall 16 dividing the housing 15 into a front compartment 17 and a rear compartment 18. The rear compartment 18 provides a reservoir for ice cubes 19 (to be shaved as herein described). The front compartment 17 houses a plurality of beverage receptacles 20, and the housing 15 is covered by a removable lid 21.

Preferably, the housing 15 is made of a suitable impact-resistant plastic material and is transparent (or at least translucent) so that the levels of the beverages or drink mixes in the respective receptacles 20 (as illustrated by the broken lines in FIG. 1) are readily visible at all times, as well as the level of the ice in the reservoir formed by the rear compartment 18 of the housing 15. The lid 21 may be lifted off, and the beverages or mixes (as well as the ice) may be replenished quickly and conveniently.

In a typical product application in a restaurant or bar, the receptacles 20 may be filled with drink mixes for pina coladas, frozen daiquiris, margueritas and Bloody Mary's (for example). Of course, the machine 10 may be used equally as well for dispensing non-alcoholic beverages.

While four beverage receptacles 20 have been shown in the drawings, it will be appreciated that the present invention is not necessarily confined thereto but, rather, is equally applicable to any reasonable number of receptacles 20 consonant with the teachings of the present invention.

Figure 5:
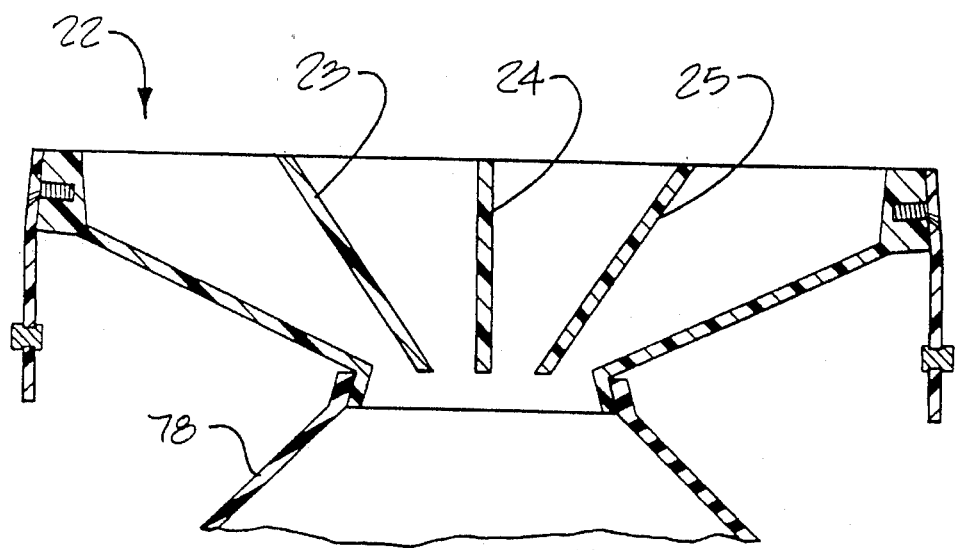
FIG. 5 is a cross-sectional view thereof, taken along the lines 5—5 of FIG. 4 and drawn to an enlarged scale, and showing the respective internal baffles in the manifold for directing the discharges of the drink mixes from the respective receptacles.

The beverage receptacles 20 are vertically-oriented and are arranged in a side-by-side relationship with respect to each other. Each receptacle 20 dispenses the drink mix or other beverage (not shown) into a manifold 22 which, as shown more clearly in FIG. 5, is provided with interior baffles 23, 24 and 25, respectively, for efficiently dispensing the beverages into the jar 13 of the blender 12.

With reference again to FIG. 2, the ice cubes 19 are fed by gravity through a funnel-shaped top cover 26 and into a blade chamber 27 formed by a hood 28 and a funnel-shaped lower cover 29. The lower cover 29 is mounted on a shaver support 30 which has a collar 31 retaining a bearing 32. The bearing 32 rotatably journals a shaft 33 connected to an ice-shaver motor (which, being conventional, has been omitted for ease of illustration). The shaft 33 has a hub 34 which carries an agitator 35 and a plurality of circumferentially-spaced rotary blades 36 within the blade chamber 27. These rotary blades 36 cooperate with a stationary blade 37, and the shaved ice falls through a chute 38 into the manifold 22 and then into the pitcher or jar 13 of the blender 12.

Figure 6:
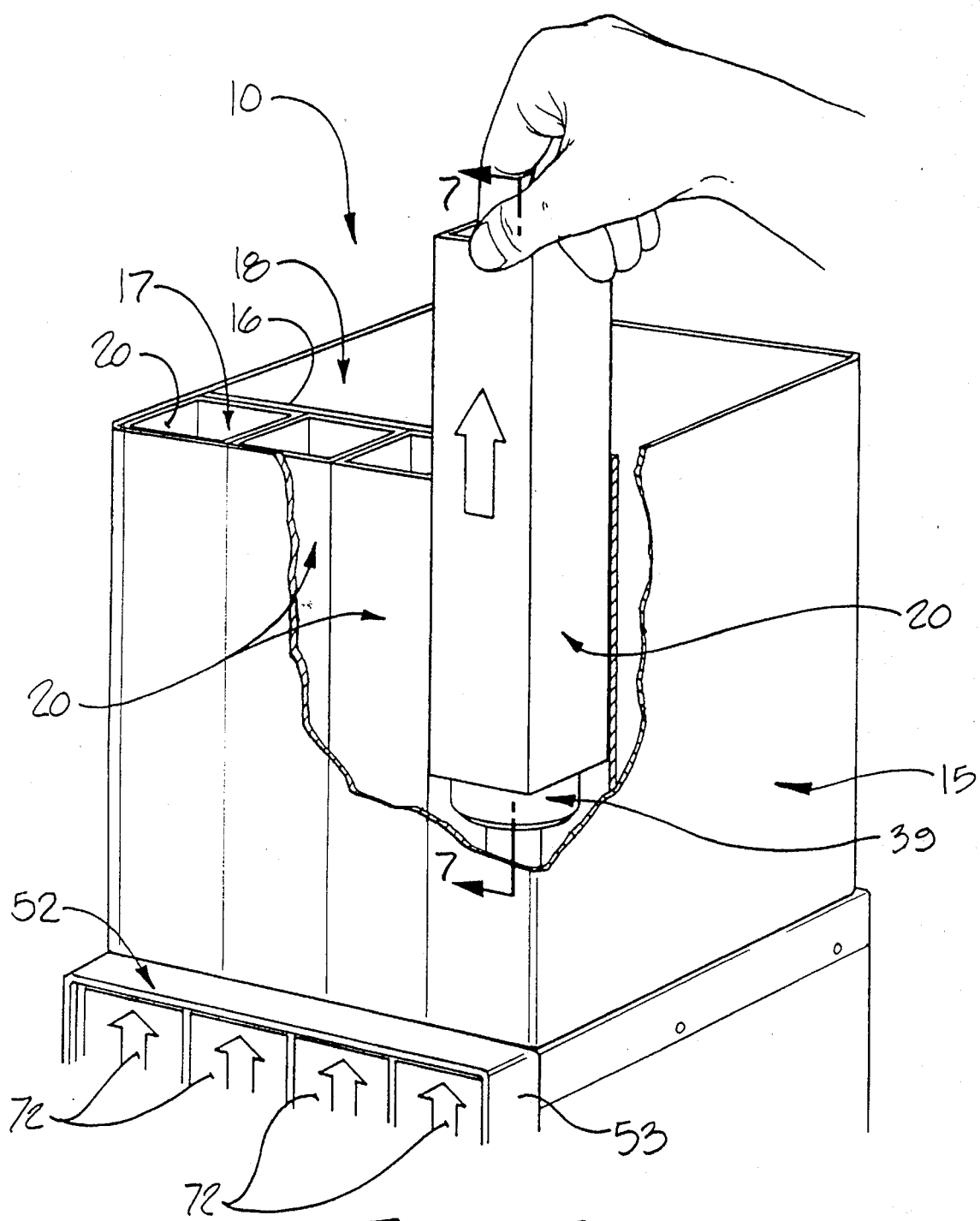
FIG. 6 is a partial perspective view of the top of the machine, showing one of the beverage receptacles being lifted out of the transparent housing.

With reference to FIG. 6, after the lid 21 has been removed, each beverage receptacle 20 (referred to as a "drink tube") may simply be lifted out of the housing 15 for service or cleaning.

Figure 7:
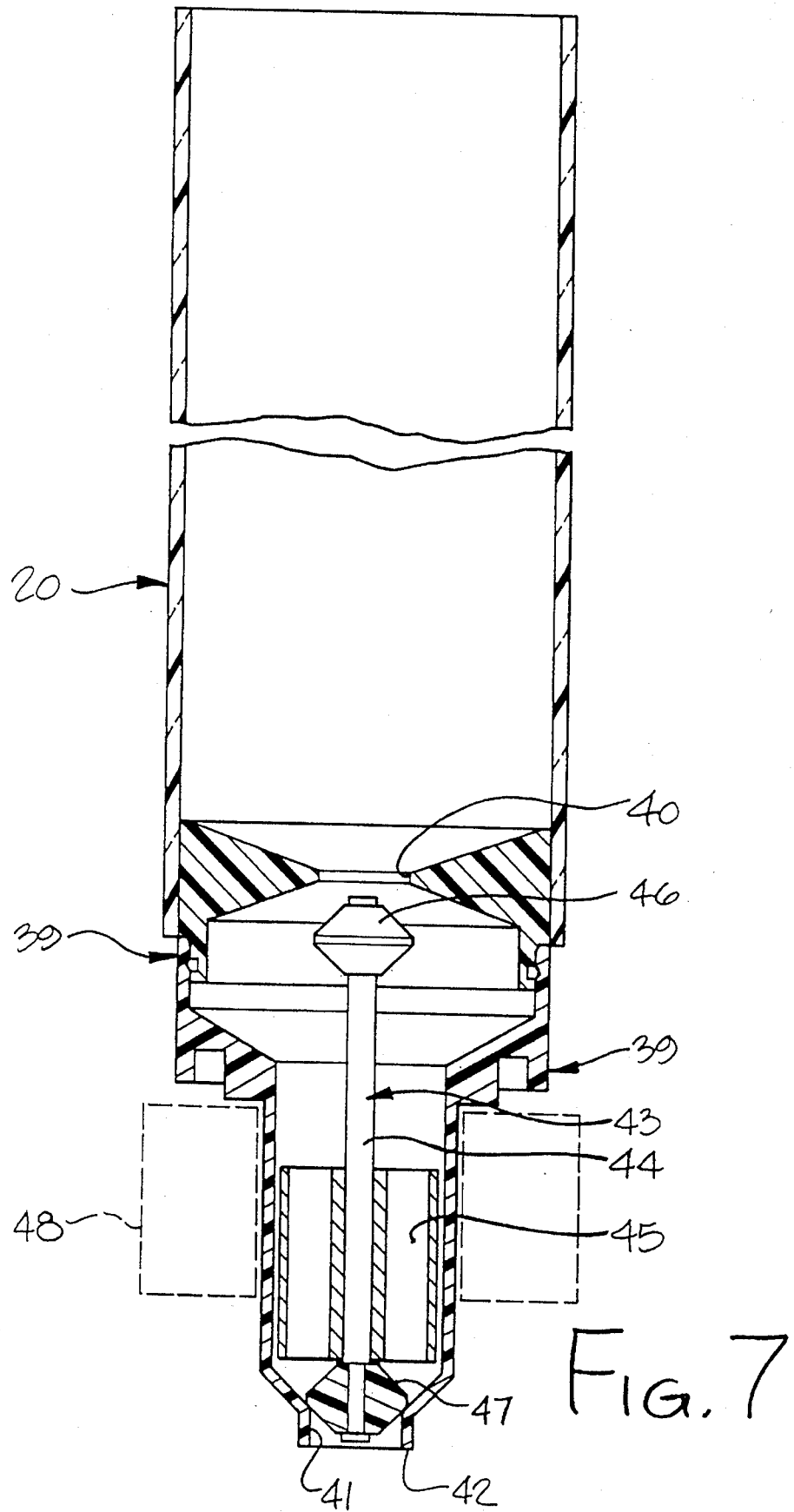
FIG. 7 is a longitudinal sectional view of one of the beverage receptacles, taken along the line 7—7 of FIG. 6, and drawn to an enlarged scale.
Figure 8:
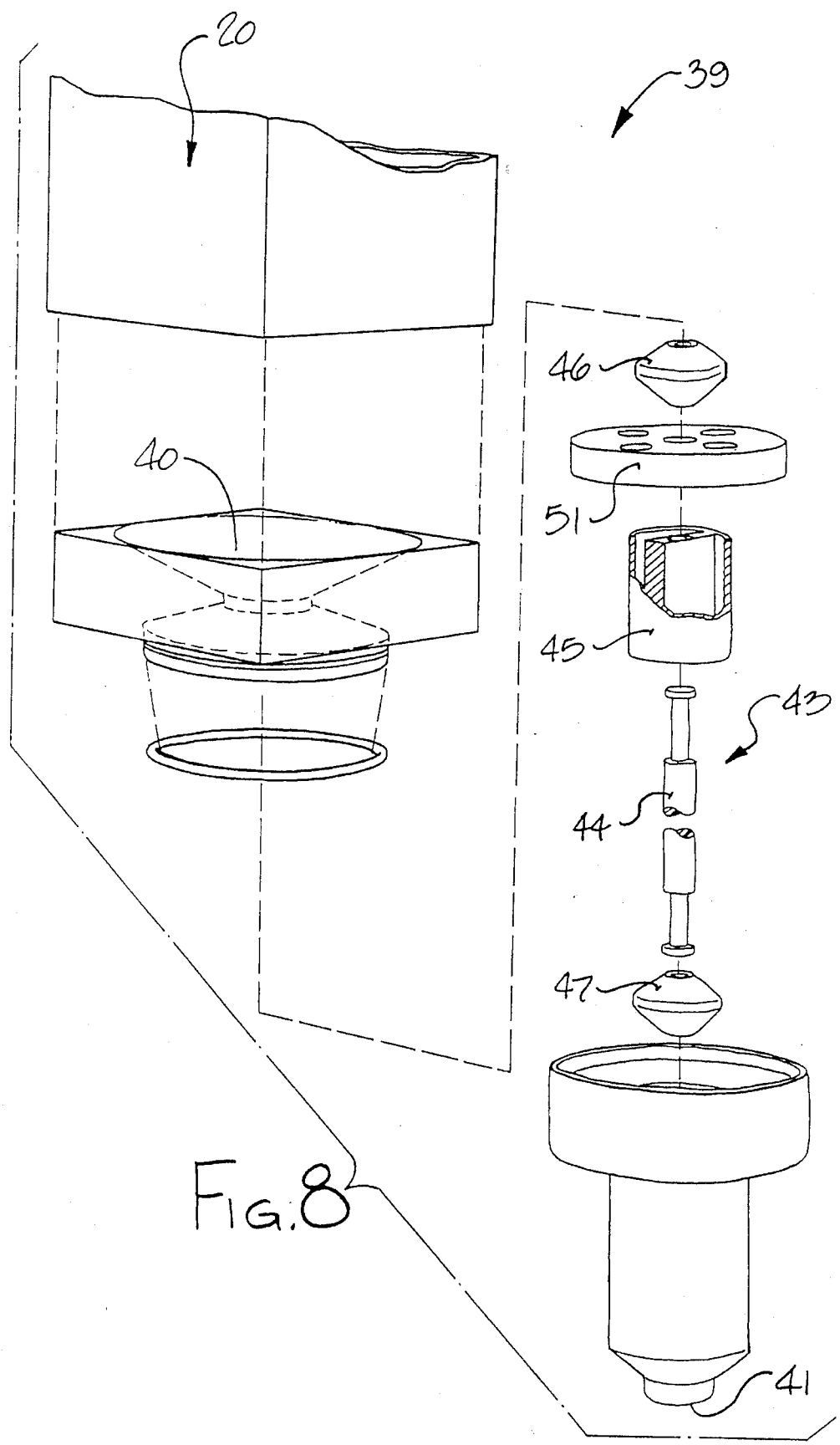
FIG. 8 is an exploded view of the components within one of the beverage receptacles, showing the piston subassembly including the solenoid carried by the piston rod and the valves on the respective ends of the piston rod.

With reference to FIGS. 7 and 8, each beverage receptacle 20 includes a lower portion 39 having an inlet port 40 intermediately of the receptacle 20 and further having a discharge port 41 at the lower end 42 of the receptacle 20.

A piston subassembly 43 reciprocates within the lower portion 39 of the receptacle 20. This piston subassembly 43 has a piston rod 44 which carries a solenoid 45. The ends of the piston rod 44 carry a pair of valves, including an upper valve 46 and a lower valve 47. The upper valve 46 seats against the inlet port 40, and the lower valve 47 seats against the discharge port 41. Alternate opening and closing of the ports 40 and 41 by the valves 46 and 47, respectively, is controlled by an electromagnetic coil 48 which actuates the solenoid 45 to reciprocate the piston subassembly 43 within the lower portion 39 of the receptacle 20.

An important feature of the present invention—previously not available in the prior art—is precise portion control of the beverage or drink mix being dispensed.

Figure 10:
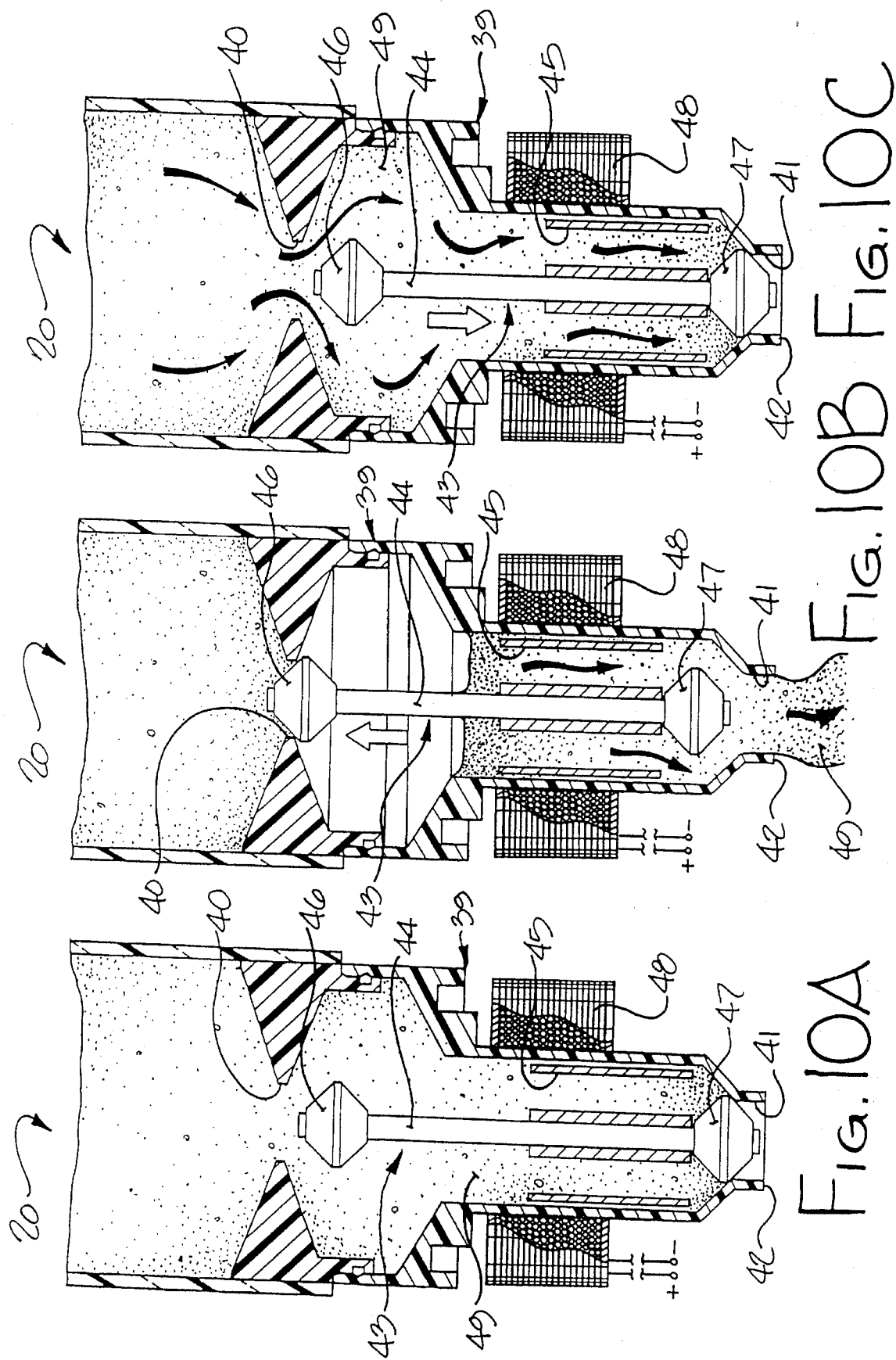
FIGS. 10A–10C are sequential views illustrating the operation of the piston subassembly for dispensing a predetermined measured or controlled portion of the beverage or mix from the machine.

This important feature is shown more clearly in FIGS. 10A–10C. In FIG. 10A, the piston subassembly 43 is in its lowermost position within the lower portion 39 of the receptacle 20, such that the lower valve 47 closes the discharge port 41, and such that the upper valve 46 opens the inlet port 40. A predetermined measured or metered amount of the drink mix (beverage or other fluid) 49 flows through the inlet port 40, past the upper valve 46, and into the lower portion 39 of the receptacle 20.

When the solenoid 45 is actuated by the electromagnetic coil 48, the piston subassembly 43 reciprocates into its alternate position (FIG. 10B) such that the inlet port 40 is closed by the upper valve 46, and such that the discharge port 41 is opened by the lower valve 47. The predetermined measured or metered amount of the drink mix 49 flows by gravity through the discharge port 41 and into the jar 13 of the blender 12.

Thereafter, and as shown in FIG. 10C, the cycle is repeated as the electromagnetic coil 48 is again energized to actuate the solenoid 45 to retract the reciprocating piston subassembly 43 back into its initial position. The lower valve 47 closes off the discharge port 41, the upper valve 46 opens the inlet port 40, and another predetermined measured or metered amount of the drink mix 49 flows into the lower portion 39 of the receptacle 20, thereby "loading" the machine 10 for another dispensing cycle. This assures precise control of the amount or volume of the drink mix 49 (or mixes) being dispensed by the machine 10.

Figure 9:
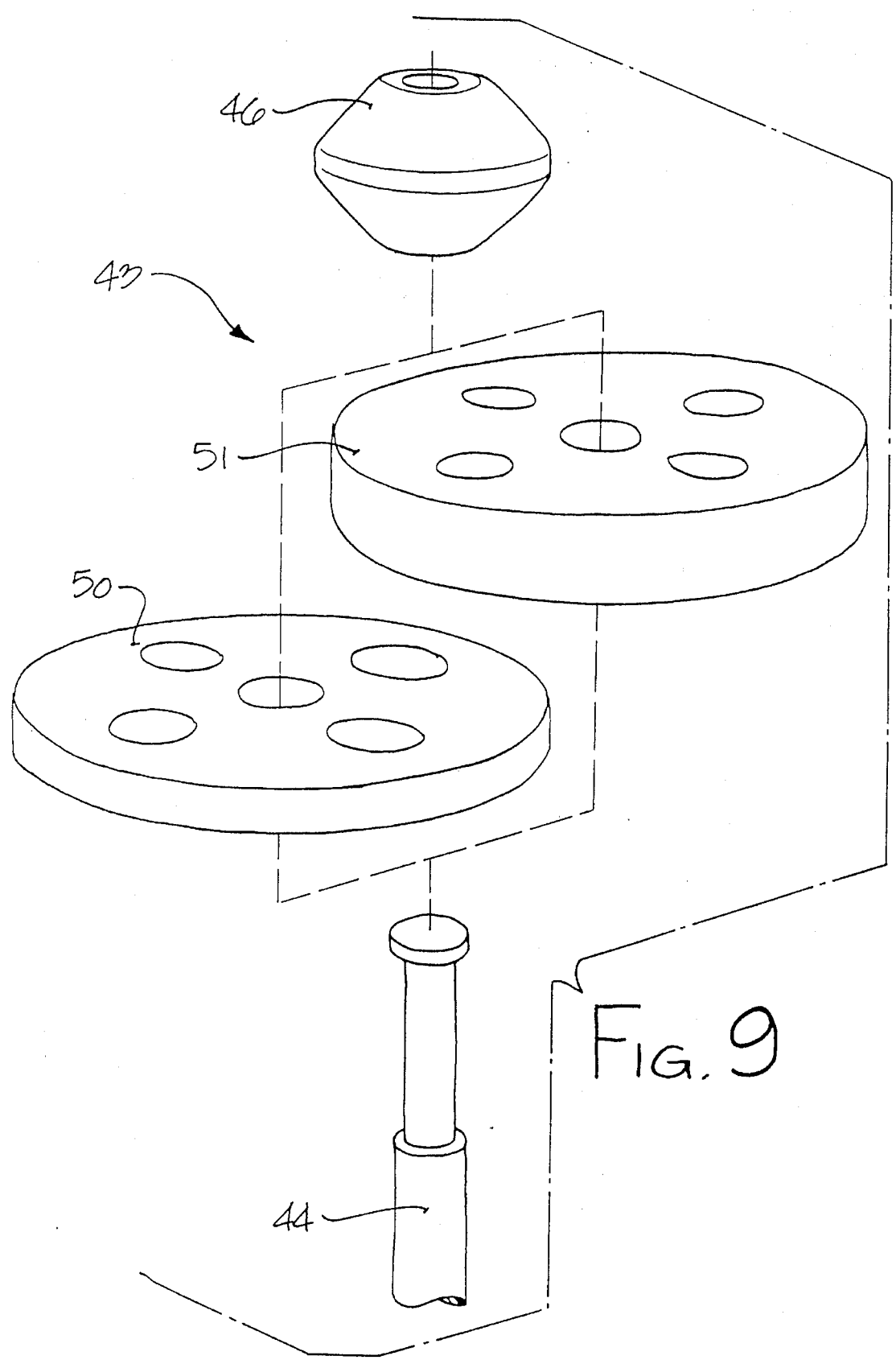
FIG. 9 is a partial perspective view of the piston subassembly in which (if desired) a selected one of a pair of discs may be mounted within the receptacle (concentrically about the piston rod) for decreasing the amount of the controlled portion of the beverage or drink mix being dispensed.

Moreover, this metered amount of the drink mix 49 may be adjusted within certain limits. In a preferred embodiment, the adjustment is between 3.0 and 5.5 ounces of the drink mix. This adjustment is facilitated by selecting one of two discs 50 and 51, respectively, shown more clearly in FIG. 9. The configuration and outer diameter of the discs 50 and 51 are identical; however, their thickness varies. Either of the discs 50 and 51 may be placed on the piston rod 44, if desired, thereby decreasing the available volume in the lower portion 39 of the receptacle 20, and thereby varying the metered portion of the drink mix 49.

Figure 11:
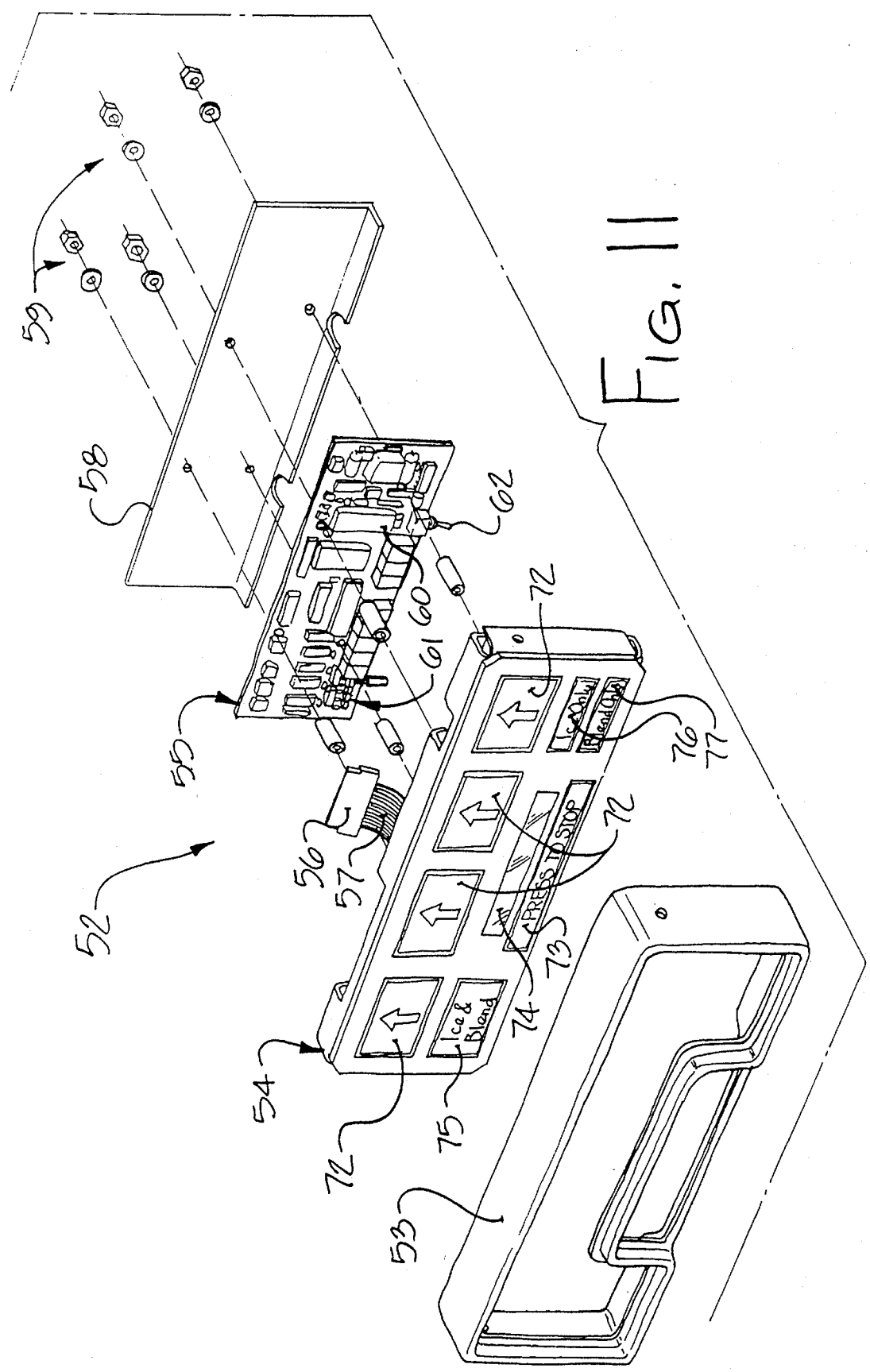
FIG. 11 is an exploded perspective view of the control panel subassembly including the front bezel, control panel, printed circuit board, and rear shield or cover.

With reference to FIG. 11, a control panel subassembly 52 is mounted on the front of the machine 10 between the housing 15 and the blender 12. The control panel subassembly 52 includes a front bezel 53, a control panel 54, a printed circuit board (or "PCB") 55 nested within the control panel 54 and electrically connected thereto by a connector 56 on a wire harness 57, and a rear shield 58 secured to the front bezel 53 by suitable hardware 59 and sandwiching the PCB 55 and the control panel 54 therebetween. The PCB 55 has a microprocessor 60 (including a "chip"), a trim "pot" (or "pots") 61 for adjusting the respective times of the blending cycle, and a "clean-up" switch 62 for a purge cycle.

Figure 12:
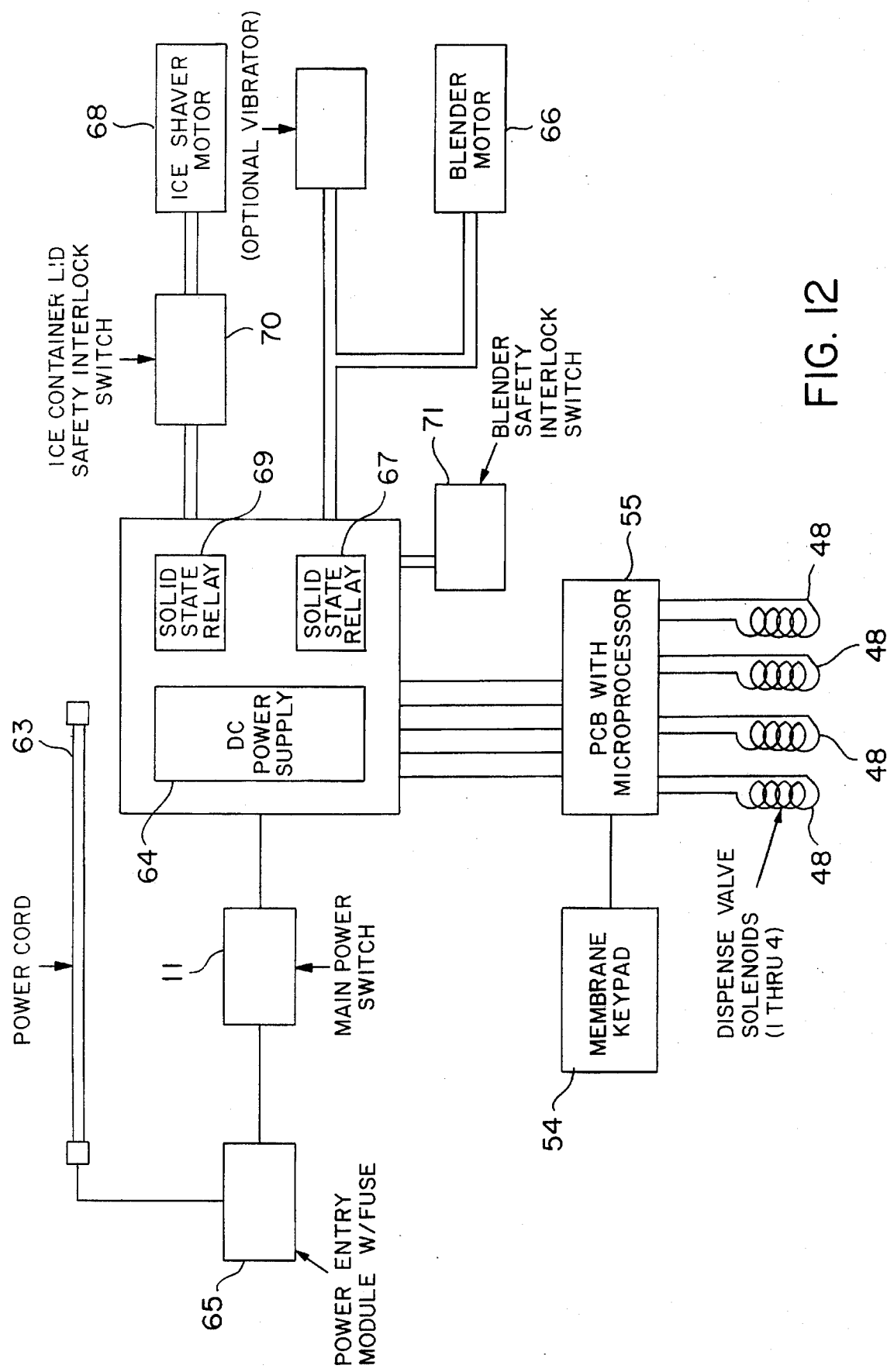
FIG. 12 is a schematic block diagram showing the electrical operation of the beverage dispensing machine of the present invention.

With reference to FIG. 12, the machine 10 may be plugged into a suitable electrical receptacle by means of a power cord 63 which supplies power to a D.C. power supply 64 through a fused power entry module 65 and the main power switch (on/off switch) 11. The D.C. power supply 64 energizes a blender motor 66 through a solid state relay 67 and thereafter energizes an ice shaver motor 68 through a solid state relay 69. A safety interlock switch 70 is provided for the lid 21 of the housing 15, and a safety interlock switch 71 is provided for the blender 12. The PCB 55 with its microprocessor 60 controls the D.C. power supply 64 and energization of the electromagnetic coils 48 (for the solenoids 45). The other components of the PCB 55 are conventional and are well known to those skilled in the art.

Figure 13:
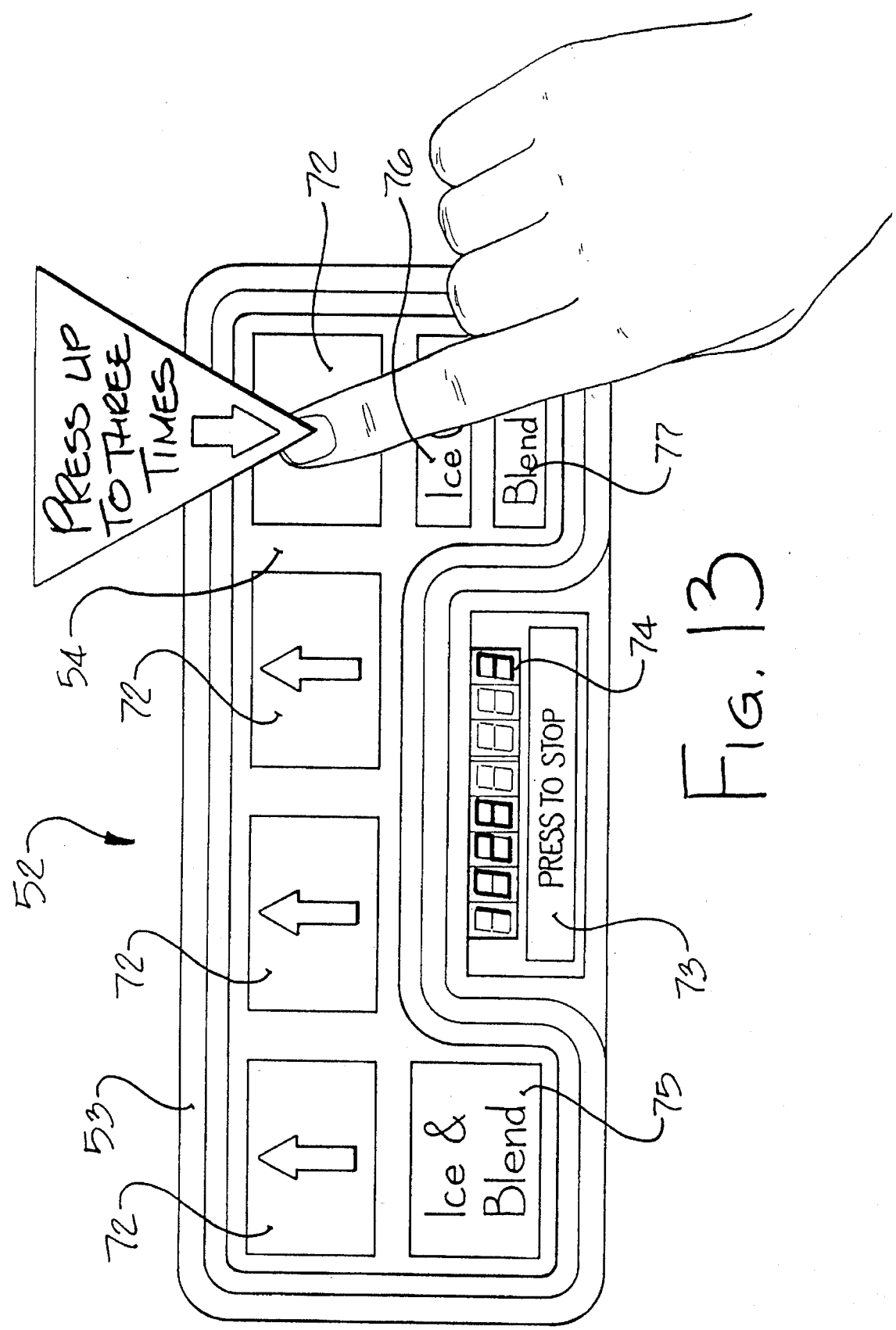
FIG. 13 is a plan view of the control panel, showing the selection buttons for the respective mixes, the "PRESS TO STOP" interrupt button, and the counter for registering the cumulative total of all drinks dispensed by the machine.

With reference to FIG. 13, the control panel 52 is provided with a plurality of selection buttons 72 corresponding to the plurality of receptacles 20 for the drink mixes 49. Each selection button 72 is vertically aligned with its respective receptacle 20 and disposed therebelow. These selection buttons 72 are relatively large and prominent and may be easily viewed within the dim, intimate lighting usually found in bars and cocktail lounges. In the preferred embodiment of the machine 10, each selection button 72 may be engaged successively up to a maximum of three times during a respective dispensing cycle, thereby facilitating the dispensing of up to three controlled portions of a selected drink mix 49.

In the event that the bartender or the cocktail waitress has made an error, or if the customer changes his or her order, a PRESS TO STOP interrupt button 73 may be "hit" to stop the dispensing cycle. In the preferred embodiment of the machine 10, this interrupt button 73 is available following initiation of the particular dispensing cycle.

A counter 74 on the control panel 54 registers the cumulative total of all drinks dispensed by the machine 10 (over a predetermined time) so that the owner of the bar, restaurant or other establishment, as well as the supplier of the drink mixes 49, has an accurate running count of the drinks dispensed by the machine 10. In a preferred embodiment of the machine 10, the counter goes up to nine thousand, nine hundred and ninety-nine. As clearly shown in FIGS. 11 and 13, the counter 74 is a digital electronic counter.

Additionally, the control panel 54 has an "ICE AND BLEND" button 75, an "ICE ONLY" button 76, and a "BLEND ONLY" button 77, so that the machine 10 is versatile for various customers needs and desires.

All of the selection buttons 73, 73 and 75–77 are "touch" buttons in the preferred embodiment of the machine 10. However, it will be appreciated by those skilled in the art, that these selection buttons 72, 73 and 75–77 (or any of them) may be mere "push" buttons, if desired.

With reference again to FIGS. 1 and 4, the manifold 22 interfaces with the jar 13 through a flexible elastomeric lid 78 (which is conventional).

Also, the drainage for the melted ice (being conventional) has been omitted for ease of illustration.

With reference to FIG. 14A, and in a particular embodiment of the machine 10, upon initiation of a respective dispensing cycle, the blender motor 68 is first started. After a first time delay of approximately 1.5 seconds, the discharge of the selected drink mix 49 is initiated from a respective beverage receptacle 20. The discharge of the selected drink mix 49 into the jar 13 of the blender 12 continues for a first time period of approximately 5.0 seconds. The shaved ice is delivered to the blender 12 upon a second time delay of approximately 1.5 seconds following the start of the discharge of the drink mix 49, and the operation of the shaver motor 66 continues for delivery of the shaved ice for a second time period of approximately 4.5 seconds. After the controlled portion of the drink mix 49 is fully dispensed to the blender 12, and after the delivery of the controlled portion of the shaved ice is completed, the blender motor 68 continues for a predetermined duration. The total duration of the blender motor 68 is approximately 12.0 seconds.

It will be appreciated by those skilled in the art, however, that these times are not limiting but are only exemplary and may be changed consonant with the teachings of the present invention.

Indeed, an adjustment means is provided for varying the first and second time delays, the first and second time periods, and the duration of operation of the blender motor 68 for each of the beverage receptacles 20. Thus, each beverage receptacle 20 may have its own individual FIG. 14A "bar chart", so that the drinks are tailored for particular customers' needs and desires. This feature allows a particular restaurant to adjust or program the machine 10 to serve certain drinks in different sized glasses. This adjustment means comprises the microprocessor 60 and its associated circuitry in the PCB 55. This microprocessor 60 may be programmed (or reprogrammed) externally of the machine 10 as is well known by those skilled in the art.

There is also a 5.0 seconds time delay of the mix and the ice, respectively, for multiple servings as illustrated in FIG. 14B.

Figure 15A:
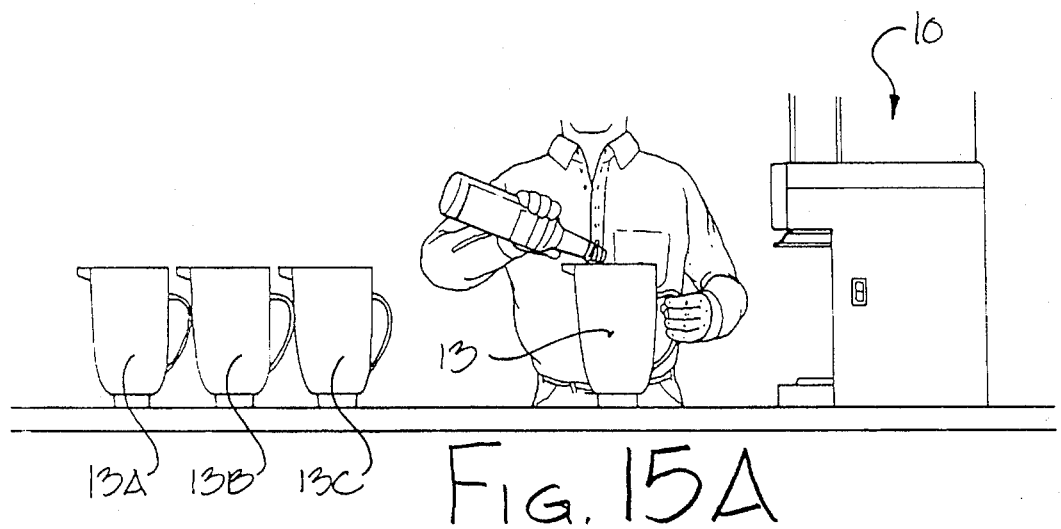
FIGS. 15A–15E are sequential pictorial views showing the convenience, ease and efficiency of using the beverage dispensing machine of the present invention.
Figure 15B:
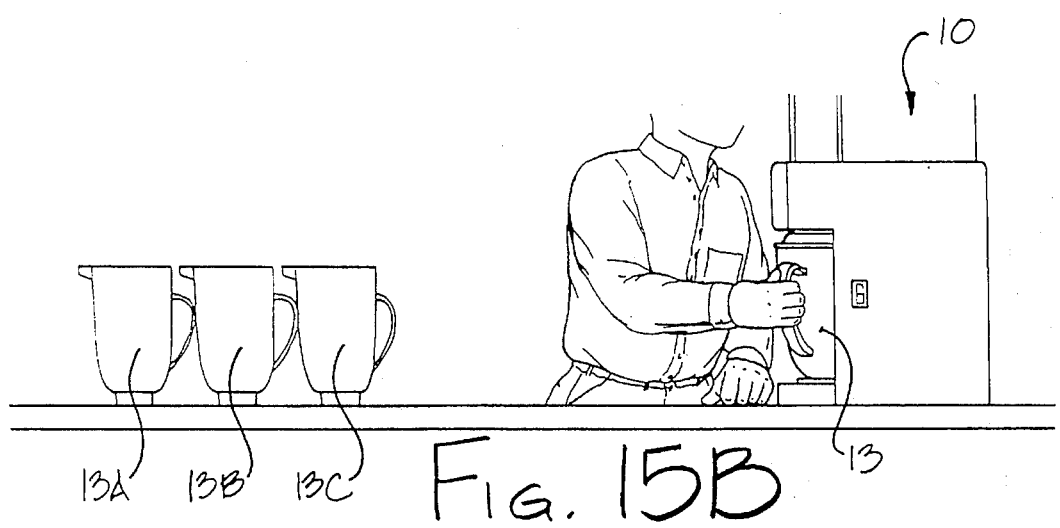
Figure 15C:
Figure 15D:
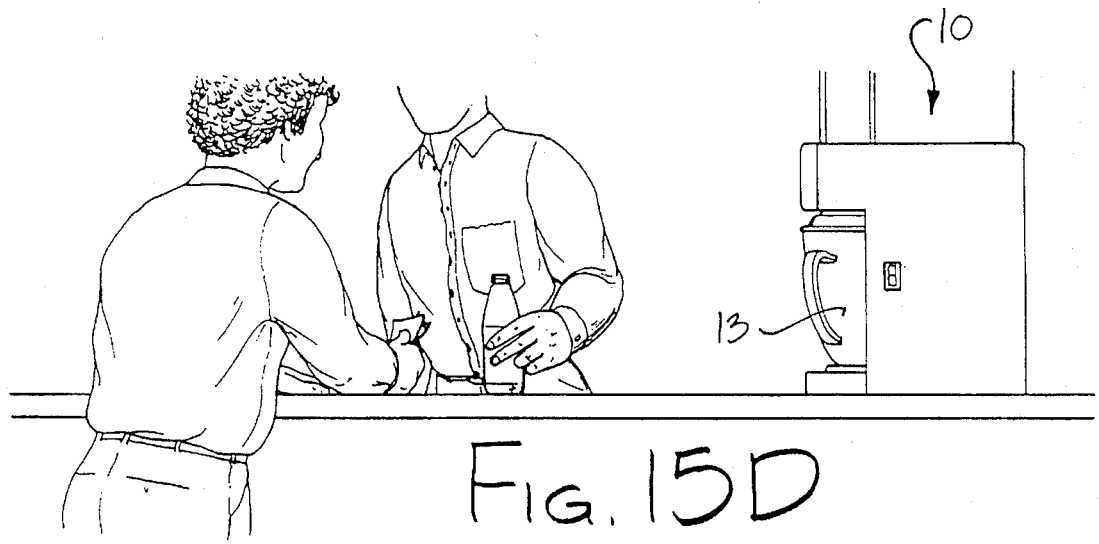
Figure 15E:

The convenience, efficiency and cost-effectiveness of the machine 10 is illustrated pictorially in FIGS. 15A–15E. The bartender can quickly pour the required "shot" or number of "shots" into the jar 13 for a particular drink ordered by a customer or by the cocktail waiter or waitress (FIG. 15A) and then place the jar 13 into the machine 10 (FIG. 15B). The bartender touches (or pushes) the particular selection button 72 the required number of times (FIG. 15C). There is no need to measure the drink mix 49 and—because of the portion control feature—there is no waste or spillage. While the machine 10 prepares the drink or drinks to precise specifications (which may take approximately twelve seconds per drink) the bartender may serve another customer (FIG. 15D). When the machine 10 is finished, the bartender pours out the drinks (FIG. 15E). There is no need to measure the drink mix or the shaved ice. These respective portions are individually controlled—and individually for each receptacle 20—and this is a valuable feature of the machine 10 of the present invention.

A plurality of jars 13, 13A, 13B and 13C may be kept handy, one for each of the drink mixes 49, and cleaned out after the bar has closed for the day. There is no need to continually clean out a jar, measure out or "eyeball" a liquid drink mix or mixes nor the ice, and stand by the blender during its operation.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a beverage dispensing machine including a blender having a motor, wherein a drink mix is blended with shaved ice in the blender during a blending cycle, the improvement which comprises a plurality of beverage receptacles for a variety of respective drink mixes, means for starting the blender motor upon initiation of the blending cycle, means for dispensing a measured amount of a respective drink mix upon a first time delay following the start of the blender motor, the measured amount of the respective drink mix continuing for a first time period, thereby facilitating precise portion control, means for delivering shaved ice upon a second time delay following the start of the discharge of the measured amount of the respective drink mix, means for continuing the delivery of the shaved ice for a second time period, and means for continuing the operation of the blender motor for a predetermined duration following cut-off of the dispensing of the drink mix and the delivery of the shaved ice.

2. The improvement of claim 1, further including adjustment means for varying the first and second time delays, the first and second time periods, and the duration of operation of the blender motor for each of the beverage receptacles.

3. The improvement of claim 2, wherein the adjustment means comprises a microprocessor.

4. The improvement of claim 3, wherein the microprocessor is remotely programmable externally of the machine.

5. In a beverage dispensing machine including a blender having a motor, wherein a drink mix is blended with shaved ice in the blender during a blending cycle, the improvement which comprises a plurality of beverage receptacles for a variety of respective drink mixes, each of the beverage receptacles having a selection button juxtaposed therewith, means for starting the blender motor upon initiation of the blender cycle, means for dispensing a measured amount of a respective drink mix upon a first time delay following the start of the blender motor, and delivering shaved ice upon a second time delay following the start of the discharge of the measured amount of the respective drink mix upon engagement of the respective selection button, the measured amount of the respective drink mix continuing for a first time period, thereby facilitating precise portion control, the delivery of the shaved ice continuing for a second time period, and means for continuing the operation of the blender motor for a predetermined duration following cut-off of the dispensing of the drink mix and the delivery of the shaved ice.

* * * * *